United States Patent [19]

Precht et al.

[11] Patent Number: 4,998,463
[45] Date of Patent: Mar. 12, 1991

[54] MACHINE FOR BREWING COFFEE AND THE LIKE

[75] Inventors: Hans J. Precht; Klaus Beumer; Bernd Scholz, all of Solingen, Fed. Rep. of Germany

[73] Assignee: Robert Krups Stiftung & Co. KG., Solingen, Fed. Rep. of Germany

[21] Appl. No.: 444,803

[22] Filed: Dec. 1, 1989

[30] Foreign Application Priority Data

Dec. 16, 1988 [DE] Fed. Rep. of Germany ....... 8815627

[51] Int. Cl.$^5$ ...................... A47J 31/30; A47J 31/00
[52] U.S. Cl. ......................................... 99/300; 99/293
[58] Field of Search .............................. 99/279–284, 99/285, 293, 294, 295, 299, 300, 302 R, 304, 305, 306, 307; 426/433; 126/383, 384

[56] References Cited

U.S. PATENT DOCUMENTS

| | | | |
|---|---|---|---|
| 3,450,024 | 6/1969 | Martin | 99/295 |
| 4,467,707 | 8/1984 | Amidt | 99/279 |
| 4,790,240 | 12/1988 | Henn | 99/282 |

*Primary Examiner*—Robert W. Jenkins
*Attorney, Agent, or Firm*—Peter K. Kontler

[57] ABSTRACT

A coffee brewing machine wherein a riser conveys heated liquid into the chamber of a liquid collecting receptacle above a filter holder containing a supply of flavoring agent, such as comminuted coffee beans. The bottom wall of the receptacle has one or more openings which admit heated liquid into the filter holder, and one or more apertures which discharge steam in such a way that the outflowing steam can or must bypass the filter holder. To this end, each aperture defines for steam a path which is inclined with reference to the bottom wall of the receptacle. An aperture can be provided in a hollow flow divider which is installed in the chamber to break up the flow of heated liquid from the riser toward the liquid discharging opening or openings. If the receptacle has a single aperture, the latter is preferably located in or at the central longitudinal vertical symmetry plane of the housing of the machine and causes the steam to leave the receptacle by flowing in such plane. If the receptacle has two apertures, they can be oriented in such a way that one aperture directs steam toward the front side and the other aperture directs steam toward the rear side of the housing.

30 Claims, 3 Drawing Sheets

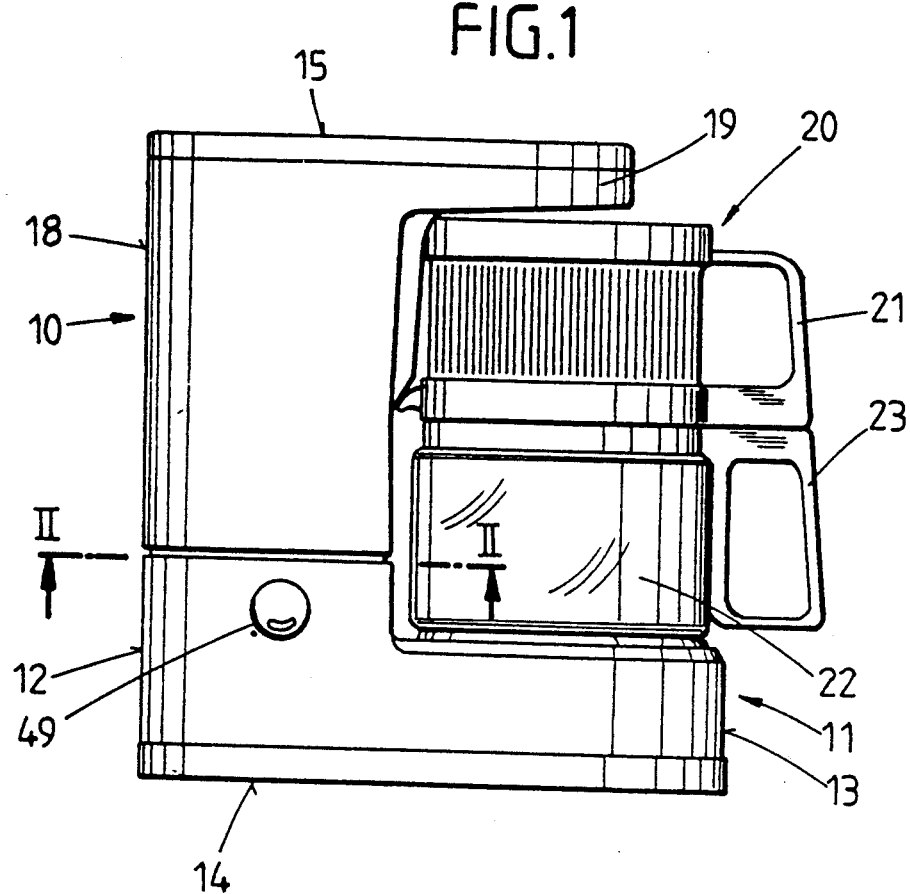
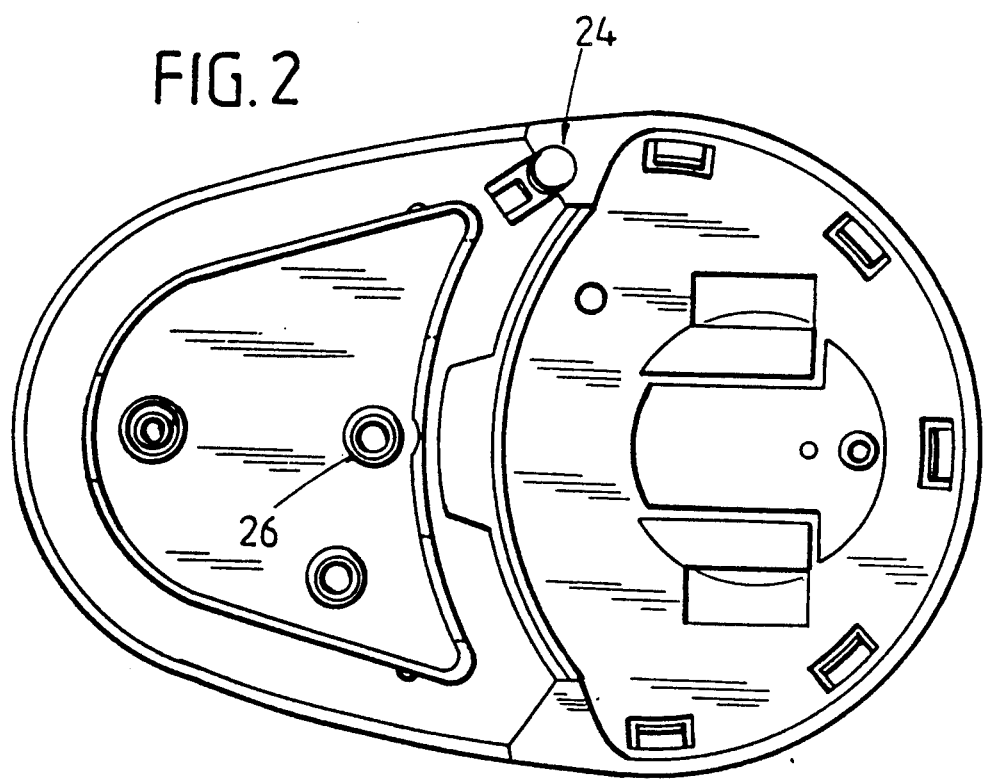

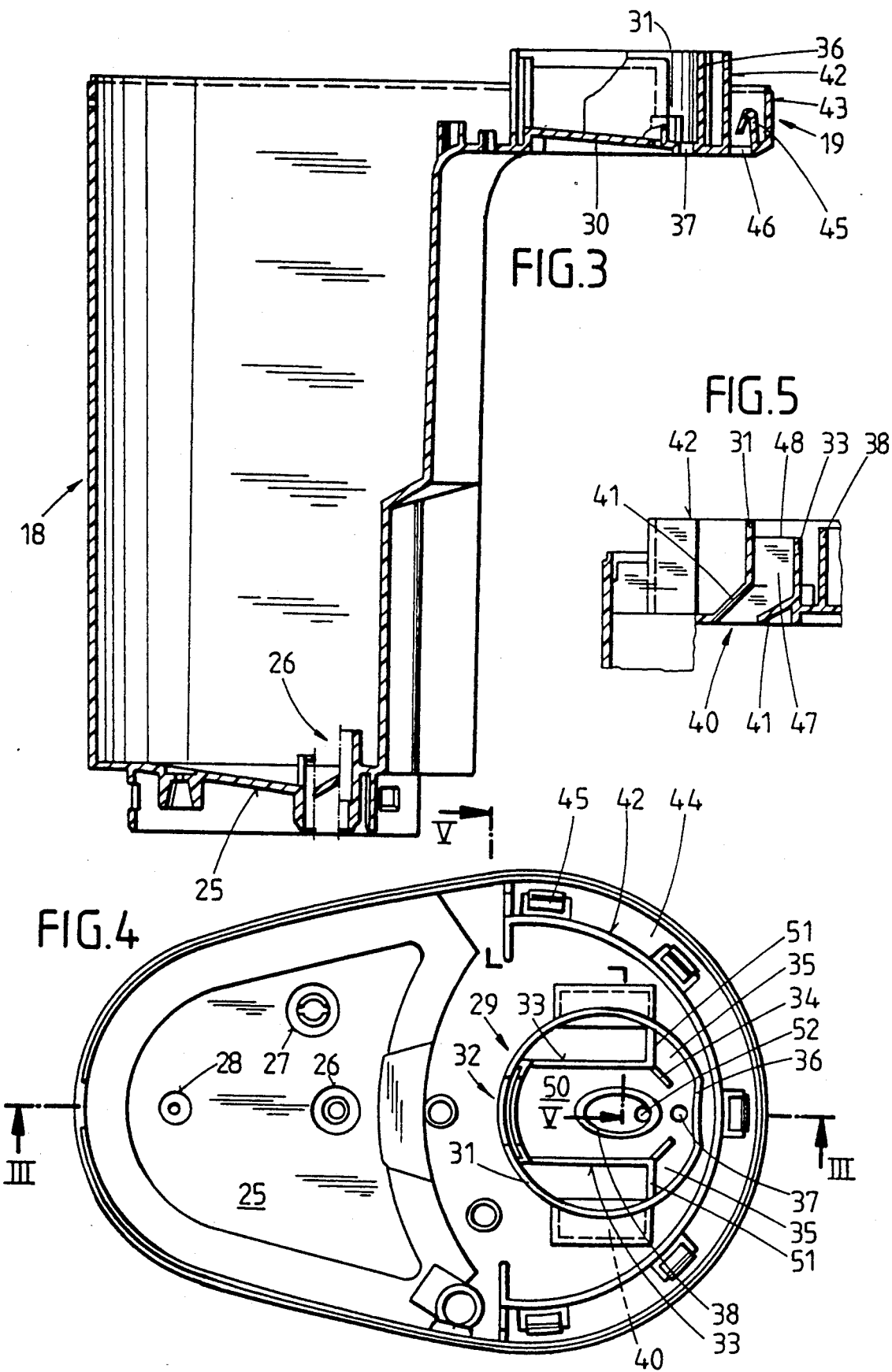

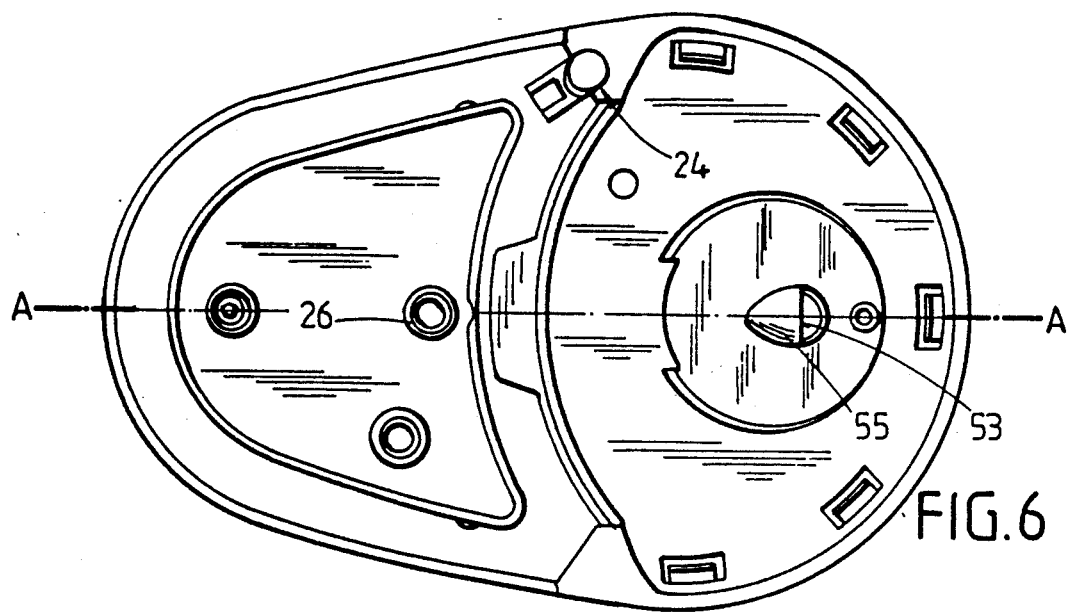
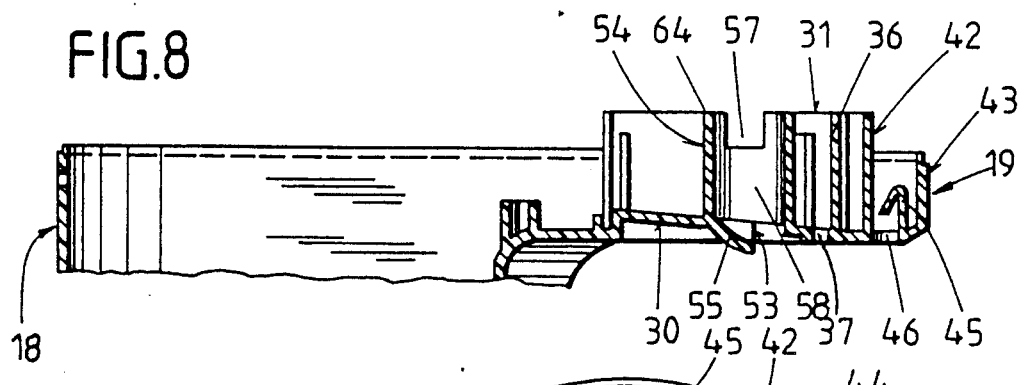

MACHINE FOR BREWING COFFEE AND THE LIKE

BACKGROUND OF THE INVENTION

The invention relates to machines for brewing coffee, tea or other hot beverages, and more particularly to improvements in machines of the type wherein the housing embodies or carries a container for cold liquid and the housing further contains or carries an electric liquid heating device serving to raise the temperature of liquid before the thus heated liquid comes into contact with comminuted coffee beans, tea leaves, pulverulent chocolate or another flavoring agent. Still more particularly, the invention relates to improvements in brewing machines of the type known as "Brewmaster" which are distributed by the assignee of the present application.

Commonly owned U.S. Pat. No. 4,790,240 granted Dec. 13, 1988 to Henn et al. for "Machine for brewing hot beverages" discloses a machine wherein heated liquid is caused to flow through a riser on its way into a filter holder in which the conveyed liquid comes into contact with the flavoring agent. It is desirable to ensure that the filter holder receive heated liquid at a substantially constant rate. Attempts to guarantee delivery of heated liquid at a substantially constant rate include the provision of a collecting receptacle above the filter holder. Heated liquid which ascends in the riser is caused to enter the receptacle, and the latter has an outlet which discharges heated liquid, at a desired rate, into the filter holder. The outlet is normally located substantially above the central portion of the filter holder. Problems arise when the riser conveys heated liquid (normally water) as well as steam. Therefore, many conventional brewing machines are provided with additional outlets which discharge steam into the surrounding atmosphere.

In accordance with a presently known proposal, the collecting receptacle for heated liquid comprises a cylindrical sidewall which extends upwardly from a bottom wall to define a chamber for heated liquid. The chamber is open at the top, and the cylindrical sidewall has an inlet which is located diametrically opposite the outlet for heated liquid. The bottom wall is provided with a slightly curved liquid-deflecting baffle which is adjacent the outlet and against which the liquid must flow on its way toward and into the outlet. The receptacle is further provided with an upright cylindrical steam evacuating tube which extends through the bottom wall. The upper end of the tube receives steam from the chamber within the cylindrical sidewall, and the lower end of the tube discharges steam into the filter holder in such a way that steam is compelled to flow vertically downwardly. The tube is spaced apart from the aforementioned liquid deflecting baffle at the outlet for heated liquid.

The just discussed machine exhibits a number of drawbacks. Thus, the baffle causes pronounced turbulence as a result of direct impingement of inflowing liquid against its deflecting surface. The inflowing liquid is caused to flow substantially at right angles to and against the deflecting surface. The thus deflected or reoriented stream of heated liquid can flow around the baffle on its way toward and into the outlet for heated liquid. A small portion of inflowing liquid can bypass the baffle and flows directly toward the outlet. The resulting currents of heated liquid in the chamber cause the aforementioned turbulence. Secondly, the vertical tube directs steam toward the lid of the filter holder or, if the lid is not in place, directly against the supply of flavoring agent in the filter holder. This creates problems if the flavoring agent consists of or contains finely comminuted coffee beans.

OBJECTS OF THE INVENTION

An object of the invention is to provide a machine for brewing coffee, tea and/or other hot beverages which is constructed and assembled in such a way that the likelihood of turbulence in the chamber of the collecting receptacle for heated liquid is less pronounced than in heretofore known machines.

Another object of the invention is to provide the machine with novel and improved means for evacuating steam from the chamber of the collecting receptacle for heated liquid.

A further object of the invention is to provide a novel and improved collecting receptacle for use in the above outlined machine.

An additional object of the invention is to provide a novel and improved housing for use in the above outlined machine.

Still another object of the invention is to provide a novel and improved method of evacuating heated liquid and steam (if any) from the collecting receptacle of an automatic machine for brewing hot coffee or other hot beverages.

An additional object of the invention is to provide a novel and improved method of separably coupling the cover to the lower part of the housing in the above outlined machine.

A further object of the invention is to provide the machine with novel and improved means for reducing turbulence in the chamber of the liquid collecting receptacle in the above outlined machine.

SUMMARY OF THE INVENTION

The invention is embodied in a beverage brewing machine, particularly in a coffee maker, which comprises a housing having a preferably separable container serving to store a supply of liquid (such as water or milk) and having outlet means, electric liquid heating means installed in the housing and including a conduit with a first inlet connected to the outlet means to receive unheated liquid and an outlet for heated liquid and steam, and a collecting receptacle having a second inlet which communicates with the outlet of the conduit. The receptacle has a bottom wall and is further provided with at least one liquid discharging opening and at least one steam evacuating aperture which is inclined with reference to the bottom wall. The machine further comprises means (such as a filter holder) for receiving heated liquid from the receptacle by way of the at least one opening.

The aforementioned conduit can include a riser which can extend, in part at least, through the container. The at least one opening and the at least one aperture are or can be provided in the bottom wall of the receptacle, and the receiving means is then disposed beneath the bottom wall of the receptacle.

The receptacle further comprises a sidewall (particularly a substantially cylindrical upright sidewall with an open top) which defines with the bottom wall a chamber receiving liquid and steam (if any) by way of the second inlet (i.e., from the conduit). The at least one steam evacuating aperture can be located in the receptacle outside of the chamber. The receptacle can further include channel means receiving steam from the chamber and communicating with the at least one aperture. The upper portion of the channel means is adjacent the sidewall, and the receptacle preferably further includes guide means including at least one substantially upright guide member which is adjacent the upper portion of the channel means. The sidewall preferably extends to a level above the at least one guide member to permit at least substantially unimpeded entry of steam from the chamber into the upper portion of the channel means for downward flow toward and through the aperture. The receptacle of such machine preferably further includes wall portions which are inclined to the horizontal and flank the at least one aperture; such wall portions can constitute integral parts of the bottom wall.

If the receptacle has a single steam evacuating aperture, such single aperture is preferably adjacent the front side of the housing, and the front side preferably carries an on-off switch which is in circuit with the electric heating means. If the receptacle has a plurality of apertures, one of the apertures is preferably adjacent the front side of the housing. For example, if the receptacle has two apertures, the apertures are preferably mirror images of each other with reference to a vertical symmetry plane of the housing.

The aforementioned guide means in the chamber within the sidewall of the receptacle preferably comprises two spaced apart substantially upright guide members which define a path for the flow of liquid from the second inlet toward the at least one opening. The guide members can be provided with fluid diverting portions in the form of suitably inclined vanes which are remote from the second inlet and preferably serve to direct the liquid toward the at least one opening. The guide members preferably further include second portions which are adjacent the liquid diverting portions. The arrangement is preferably such that the chamber includes two compartments each of which is bounded by the two portions of one of the guide members and each of which communicates with the at least one opening. Such compartments are further bounded by portions of the sidewall. The liquid diverting portions are inclined with reference to the second portions of the respective guide members.

The sidewall preferably includes a portion which is rather closely adjacent the at least one opening. For example, the sidewall can include or constitute an upright cylinder, and the aforementioned portion of such sidewall can have a flat or convex internal surface confronting the at least one opening.

A flow divider is preferably provided in the aforementioned path between the guide members to ensure the establishment of laminar flow of heated liquid toward the at least one opening. The flow divider can be installed substantially midway between the two guide members and can have a substantially elliptical cross-sectional outline with a first rounded end portion confronting the second inlet and a second end portion confronting the at least one opening. The flow divider is or can be hollow, and the bottom wall preferably includes a portion which is inclined to the horizontal, which is located beneath the hollow flow divider and which has at least one passage for evacuation of liquid (if any) from the interior of the flow divider.

The housing is preferably provided with an open top to facilitate replenishment of the supply of liquid in the container, and the machine then further comprises a cover for the open top and means for preferably separably coupling the cover to the housing. The housing can be provided with a lateral extension (such extension can include or constitute the aforementioned receptacle), and the coupling means can include substantially hook-shaped coupling elements in the extension of the housing. The extension can include a peripheral wall and a second wall which is spaced apart from and is surrounded by the peripheral wall to define with the latter a space for the coupling elements.

The at least one steam evacuating aperture can be located in or close to a central vertical symmetry plane of the housing. The at least one aperture of such machine can extend in a direction from the second inlet toward that portion of the aforementioned peripheral wall of the extension of the housing which is remotest from the second inlet. Such aperture can be provided in the flow divider. The bottom wall of the receptacle includes a first portion provided with a first portion of the aperture and being inclined to the horizontal, and a second portion which is or can be substantially horizontal and is provided with a second portion of the aperture. The tubular body of the flow divider extends from the bottom wall toward the cover for the open top of the housing, and such tubular body is preferably provided with at least one window for admission of steam from the chamber into the interior of the tubular body and thence into the at least one aperture. As mentioned above, the tubular body of the flow divider can have a substantially elliptical cross-sectional outline and it can be provided with two windows which are preferably mirror symmetrical to each other with reference to a straight line including the foci of the elliptical outline. The top face of the tubular body of the flow divider can abut the underside of the cover when the latter is properly mounted on top of the housing.

The aforementioned guide members are preferably parallel to each other, and their vanes are oriented to direct liquid from the path between them toward and into the at least one opening. As mentioned above, the guide members and the adjacent portions of the sidewall of the receptacle preferably define two compartments which form part of the chamber, which are adjacent the vanes of the guide members and which communicate with the at least one opening.

The novel features which are considered as characteristic of the invention are set forth in particular in the appended claims. The improved machine itself, however, both as to its construction and the mode of operating the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a schematic front elevational view of a machine for brewing hot beverages which embodies one form of the invention and wherein the liquid collecting receptacle has several steam evacuating apertures;

FIG. 2 is an enlarged view of a detail as seen in the direction of arrows from the line II—II of FIG. 1, showing from below that portion of the housing which includes the container and the extension;

FIG. 3 is a central vertical sectional view of the container and of the extension, substantially as seen in the direction of arrows from the line III—III of FIG. 4;

FIG. 4 is a plan view of the structure which is shown in FIG. 1, with the cover removed;

FIG. 5 is a fragmentary vertical sectional view substantially as seen in the direction of arrows from the line V—V of FIG. 4;

FIG. 6 is a view similar to that of FIG. 2 but showing the housing of a modified machine with a single steam evacuating aperture;

FIG. 7 is a plan view of the structure which is shown in FIG. 6, with the cover for the open top of the housing removed; and FIG. 8 is a sectional view substantially as seen in the direction of arrows from the line VIII—VIII of FIG. 7.

DESCRIPTION OF PREFERRED EMBODIMENTS

FIG. 1 shows the front side of a brewing machine 10 which embodies one form of the invention. The machine 10 comprises a hollow housing 11 which carries or contains all other components including electrical and electronic components which are not shown in the drawing because they form no part of the present invention. Those components which are not specifically shown in the drawing but are necessary for proper operation of the improved machine 10 are or can be identical with those used in certain presently known machines, for example, those known as "Brewmaster Jr." coffee maker No. 170, "Brewmaster" coffee maker No. 150 and "Brewmaster II" coffee maker No. 158, all distributed by the assignee of the present application. The machine 10 is further equipped with a cable or cord for connection to an outlet or to another source of electrical energy and is supplied with filter paper for reception of metered quantities of a flavoring agent.

The housing 11 is made of a suitable plastic material and includes a substantially L-shaped first portion or section having a relatively short upright leg 12 and a longer horizontal leg 13. The legs 12 and 13 are hollow and serve to accommodate various electrical and electronic components of the machine 10. The underside of the horizontal leg 13 is closed by a detachable bottom wall 14. The components in the legs 12, 13 include an electric heater which is or can be identical with that shown and described in the aforementioned U.S. Pat. No. 4,790,240 to Henn et al. The disclosure of this patent is incorporated herein by reference. Suitable electric heaters are also described in numerous pending United States and foreign patent applications and granted patents of the assignee of the present application. The bottom wall 14 can be secured to the leg 13 by male and female detent elements, by threaded fasteners or in any other suitable way. The electric heater is preferably installed in the leg 13 and can include a warming plate (shown in the patent to Henn et al.) to maintain the freshly brewed beverage (e.g., hot coffee) at an optimum temperature while the beverage is confined in a glass coffee pot 22 or in another suitable vessel.

The housing 11 further comprises or carries a relatively large container 18 for fresh liquid. The lower portion of the container 18 is preferably separably affixed to the short upright leg 12 and the top of this container is open or can be exposed in order to permit convenient introduction of a fresh supply of liquid, e.g., cold water. A detachable or pivotably or slidably mounted cover 15 is provided to close the open top of the container 18 and to overlie the open top of an extension 19 including or constituting a collecting receptacle for heated liquid which is to be admitted into a filter holder 20 serving as a means for receiving heated liquid from the collecting receptacle.

The bottom wall 25 (FIGS. 4 and 5) of the container 18 has an outlet 27 which is controlled by a standard valve (not shown) and serves to admit cold liquid into a hose serving to connect the container 18 with a conduit (see FIG. 1 of the patent to Henn et al.) which conveys a stream of liquid through the electric heater in the leg 13 of the housing 11. The conduit can be said to form part of the electric heater and includes a riser (shown and described in the patent to Henn et al.) serving to convey heated liquid and steam (if any) toward and having an outlet connected with an inlet 32 in a cylindrical sidewall 31 forming part of the collecting receptacle or extension 19 and shown in FIGS. 3 and 4. The electric heater is preferably of the type wherein the stream of liquid flowing from the container 18 toward the inlet 32 is heated in a selected portion of the conduit prior to entering the riser. The topmost portion of the riser is substantially horizontal and its outlet is connected with or extends into the inlet 32 to admit a stream of heated liquid and steam (if any) into a chamber 29 within the cylindrical sidewall 31 and above the bottom wall 30 of the collecting receptacle 19.

The filter holder 20 has a handle 21 and rests on top of the pot 22 which is also provided with a handle 23. The central portion of the lid of the filter holder 20 has an opening for admission of heated liquid into contact with flavoring agent, e.g., finely comminuted coffee beans in a filter paper which is removably confined in the casing of the filter holder 20. The latter has a bottom wall provided with one or more openings for admission of freshly brewed beverage into the pot 22. The pot is supported by the aforementioned warming plate in the leg 13 of the housing 11. The filter holder 20 preferably defines a substantially conical chamber for reception of filter paper with a metered quantity of flavoring agent. For example, the filter holder 20 can be designed to receive paper for metered quantities of flavoring agent which are required to make two, four or eight cups of coffee, tea or another hot beverage.

The pot 22 can be made of a light-transmitting vitrous material and is preferably provided with a spout for convenient pouring of hot beverage into a cup or mug. The temperature of the warming plate for the pot 22 is preferably adjustable to ensure that the supply of beverage in the pot is maintained at an optimum temperature for serving.

As mentioned above, FIG. 1 shows the front side of the machine 10. The front side of the leg 12 carries an on-off switch 49 which is in circuit with the electric heater in the leg 13 and is or can be provided with a source of light to be turned on when the electric heater is in use to heat the stream of liquid flowing from the outlet 27 of the container 18 toward the chamber 29 within the sidewall 31 of the collecting receptacle 19. The aforementioned riser can extend through the interior of the container 18 and, to this end, the bottom wall 25 of the container has an inlet 26 serving to receive heated liquid from that portion of the conduit which is confined in the leg 13. The inlet 26 is connected to the lower end of the riser and the horizontal upper portion of the riser is adjacent the underside of the cover 15 and its outlet admits heated liquid and steam (if any) into the chamber 29 by way of the inlet 32 in the sidewall 31 above the bottom wall 30. The on-off switch 49 is a commercially available part and can be combined with a timer to ensure that the electric heater is turned off a predetermined interval of time following completion of the circuit of the heater in the leg 13. Such combinations of on-off switches and timers, with or without light sources to indicate whether or not the electric heater is in actual use, are known and are extensively used in existing brewing machines for coffee, tea or other hot beverages.

The bottom wall 25 of the container 18 is provided with one or more openings 28 (FIGS. 2 and 4) for the shank or shanks of one or more threaded fasteners (not shown) which separably connect the container 18 to the leg 12. Other types of fastener means can be used with equal or similar advantage. It goes without saying that the opening or openings 28 are adequately sealed to prevent escape of confined liquid from the interior of the container 18; such liquid can leave the container only by way of the outlet 27 when the aforementioned valve which controls the outflow of liquid from the container is open. The supply of liquid in the container 18 can be replenished upon detachment, lateral shifting or pivoting of the cover 15.

The sidewall 31 which surrounds the chamber 29 in the collecting receptacle 19 is or can be an integral part of the bottom wall 30 and is generally cylindrical with the exception of a relatively small portion 36 which is remote from the inlet 32 and has a convex or flat inner side adjacent a liquid discharging opening 37 in the bottom wall 30.

The chamber 29 contains guide means including two parallel upright guide members 33 which are or can constitute integral parts of the bottom wall 30 and define an elongated path or passage 50 for the flow of heated liquid from the inlet 32 toward the opening 37 and against the aforementioned portion 36 of the sidewall 31. The height of the guide members 33 is somewhat less than the height of the sidewall 31 (see FIG. 5), i.e., the top face of the sidewall 31 extends to a level above the top faces of the guide members 33 and can actually abut the underside of the cover 15 when the latter is in its operative position to close and seal the upper end of the container 18 and the upper side of the collecting receptacle or extension 19.

Those end portions (34) of the guide members 33 which are remote from the inlet 32 in the sidewall 31 can be said to constitute liquid deflecting vanes serving to direct the stream of heated liquid in the path 50 toward and into the opening 37 in the bottom wall 30. Each guide member 33 further comprises a second portion 51 which is adjacent and is inclined with reference to the respective liquid deflecting vane 34 to form with such vane (and with the adjacent portion of the sidewall 31) a relatively small compartment 35 forming part of the chamber 29 and communicating with the opening 37. The second portions 51 extend at right angles to the major portions of the respective guide members 33 and are, or can be, integral with the sidewall 31.

The bottom wall 30 of the collecting receptacle 19 is integral with or is connected to a flow divider 38 which is located in the path 50, preferably midway between the guide members 33, and has an upright tubular body with a substantially oval cross-sectional outline. One rounded end portion of the tubular body of the flow divider 38 confronts the inlet 32 of the sidewall 31, and the other rounded end portion of such tubular body confronts the opening 37 and the inwardly bulging portion 36 of the sidewall 31. The flow divider 38 is nearer to the opening 37 than to the inlet 32.

Heated liquid which enters the chamber 29 by way of the inlet 32 flows along the path 50 and is split by the flow divider to thereupon flow along the convergent sides of the vanes 34 toward the opening 37 and toward the portion 36 of the sidewall 31. The portion 36 directs a certain percentage of heated liquid into the compartments 35 where the direction of liquid flow is reversed and the thus reoriented flow enters the opening 37 by flowing along the outer sides of the vanes 34.

The tubular body of the flow divider 38 can but need not serve as a means for evacuating steam from the chamber 29. In order to ensure that liquid and/or steam which happens to enter the hollow tubular body of the flow divider 38 can leave the collecting receptacle 19, that portion of the bottom wall 30 which is located beneath the flow divider 38 has at least one hole or passage 36 for admission of liquid into the filter holder 20. Steam which enters the interior of the flow divider 38 condenses in the tubular body, and the thus obtained condensate leaves the flow divider by way of the hole 52.

As can be seen in FIG. 3, the bottom wall 30 of the collecting receptacle is at least slightly inclined. The hole 52 is preferably provided in the lowermost part of that portion of the bottom wall 30 which is located beneath the tubular body of the flow divider 38.

The bottom wall 30 of the receptacle 19 is provided with two steam evacuating apertures 40 which are located outside of the chamber 29, i.e., externally of the sidewall 31. One of the apertures 40 is adjacent the front side of the housing 11, i.e., close to that side which carries the on-off switch 49. The two apertures 40 are preferably mirror symmetrical to each other with reference to a central longitudinal vertical symmetry plane (note the line III—III in FIG. 4) of the housing 11. As can be seen in FIG. 5, the apertures 40 are inclined with reference to the horizontal and to the plane of the bottom wall 30 and are bounded by bottom wall portions 41 which ensure that streams of steam leaving the receptacle 19 by way of the respective apertures 40 do not flow vertically downwardly but, instead, preferably bypass the filter holder 20.

The apertures 40 receive steam from discrete channels 47 which are defined by the adjacent portions of the sidewall 31 together with the respective guide members 33. The inlets 48 of the channels 47 receive steam from the chamber 29; such inlets are disposed at the top faces of the guide members 33 which are shorter than the adjacent portions of the sidewall 31. It can be said that the top portions of the channels 47 are bounded by the respective guide members 33 in conjunction with the adjacent portions of the sidewall 31, and that the lower or bottom portions of the channels 47 extend to and are partially bounded by the inclined bottom wall portions 41.

If the receptacle 19 is provided with a single steam evacuating aperture 40, such single aperture is preferably adjacent the front side of the housing 11.

FIG. 2 shows that the container 18 is provided with a standard liquid level indicator 24 which enables the person in charge to ascertain, without lifting or otherwise moving the cover 15, whether or not the supply of liquid in the container must be replenished.

The cover 15 of the machine 10 which is shown in FIGS. 1 to 5 is separably coupled to the receptacle 19. The means for separably coupling the cover 15 comprises hook-shaped coupling elements 45 which are provided in an arcuate space 44 between a peripheral wall 43 and an inner wall 42 of the receptacle 19. FIG. 4 shows that the walls 42, 43 are concentric and cylindrical, i.e., the width of the space 44 is preferably constant The wall 42 and/or the wall 43 can form an integral part of the bottom wall 30. The space 44 confines five equidistant hook-shaped coupling elements 45 which are or can be of identical design. Each coupling element 45 is disposed above a slot 46 which is provided in the bottom wall 30 and affords access to a tool which is to be used to detach the coupling means (not shown) at the underside of the cover 15 from the coupling elements 45. The arrangement may be such that the cover 15 is automatically detached from the coupling elements 45 in response to exertion of a certain pull in order to deform the coupling elements 45 and/or the complementary coupling means of the cover. Other types of coupling means can be employed to establish a separable connection between the cover 15 and the housing 11, or the cover can be pivotably or slidably secured to the receptacle 19 and/or to the container 18.

An important advantage of the improved machine is that the rate of flow of heated liquid into the filter holder 20 is more satisfactory than in conventional machines. In addition, evacuation of steam from the collecting receptacle 19 takes place without adversely affecting the brewing of hot beverage in the filter holder. This is achieved by the expedient of inclining the direction of evacuation of steam with reference to the horizontal and with reference to the bottom wall 30 of the collecting receptacle. The selected direction of evacuation of steam from the receptacle 19 is or can be such that the outflowing steam completely bypasses the filter holder 20.

A receptacle 19 with a plurality of steam evacuating apertures (40) ensures rapid and complete evacuation of large quantities of steam in two or more desired directions. The apertures 40 can be relatively large since they need not be disposed within the confines of the sidewall 31. The channels 47 direct steam from the chamber 29 into the respective apertures 40 which are located externally of the sidewall 31. The upper or top portions of the channels 47 are or can be vertical, as long as the apertures 40 ensure proper orientation of outflowing steam in a direction other than vertically downwardly.

The flow divider 38 constitutes an optional but highly desirable and advantageous feature of the receptacle 19. This flow divider prevents direct flow of heated liquid from the inlet 32 of the sidewall 31 toward and into the opening 37. Instead, the incoming stream of liquid is broken up into a plurality of laminar flows which are guided by the adjacent (preferably flat) inner sides of the guide members 33 as well as by the adjacent convex portions of the outer side of the flow divider 38 on their way toward and along the inner sides of the vanes 34. The flow divider 38 greatly reduces turbulence in the flow of heated liquid toward the aperture 37. A flow divider with a body having an elliptical cross-sectional outline and being oriented in a manner as shown in FIG. 4 offers little resistance to the flow of liquid toward the aperture 37 while ensuring the establishment of a desirable laminar flow.

The flow divider 38 and/or the guide means including the members 33 and/or the sidewall 31 can constitute separately produced parts which are secured to the bottom wall 30 of the receptacle 19. However, and especially if the housing 11 and its container 18 and receptacle 19 are made of a plastic material, it is presently preferred to make the parts 31, 33 and 38 integral with the bottom wall 30 in order to reduce the cost of the housing and to avoid problems in connection with leakage of steam and/or heated liquid.

As a rule, the quantity of liquid and/or condensate which gathers in the interior of the flow divider 38 is very small or negligible. Therefore, it normally suffices to provide the lowermost part of the downwardly inclined bottom wall portion beneath the flow divider 38 with a single relatively small hole or passage 36.

FIGS. 6 to 8 show certain parts of a modified machine. All such components which are identical with or clearly analogous to the corresponding components of the machine 10 of FIGS. 1 to 5 are denoted by similar reference characters.

The receptacle 19 of the housing forming part of the machine of FIGS. 6 to 8 has a single steam evacuating aperture 53 which is located at or close to the central longitudinal vertical symmetry plane A—A of the housing. Furthermore, the aperture 53 is located within the hollow tubular body 56 of the flow divider 54 in the path 62 which is defined by the guide members 60 in the chamber 29 within the generally cylindrical sidewall 31 of the receptacle 19. The aperture 53 is inclined to the horizontal and with reference to the slightly inclined bottom wall 30 of the receptacle 19. The inclination of the aperture 53 is such that it directs steam in a direction from the inlet 32 of the sidewall 31 toward the liquid discharging opening 37 at the inwardly bulging portion 36 of the sidewall 31 and toward that potion (63) of the peripheral wall 43 which is remotest from the inlet 32. It will be noted that the direction of outflow of steam by way of the aperture 53 is substantially at right angles to the direction of flow of steam through the aperture 40 which are shown in FIG. 4 and which discharge steam in directions at right angles to the symmetry plane A—A. A common feature of the apertures 40 and aperture 53 is that they discharge steam at an oblique angle to the horizontal and to the plane of the respective bottom wall 30. This reduces the likelihood of impingement of discharged steam at right angles to the lid of the filter holder 20 or at an undersirable angle with reference to filter paper in the filter holder 20.

The bottom wall 30 includes a concavo-convex portion 55 which is disposed beneath the hollow flow divider 54 and is adjacent a first portion of the aperture 53. A second portion 59 of such aperture is provided in the adjacent substantially horizontal portion of the bottom wall 30. The concave upper side of the bottom wall portion 55 directs steam downwardly and at an angle to the direction of flow of steam in the portion 59 of the aperture 53.

The tubular body 56 of the flow divider 54 has a substantially elliptical or oval cross-sectional outline. The sharply rounded end portion of this tubular body 56 confronts the inlet 32 and the less sharply rounded end portion confronts the opening 37 in the bottom wall 30. The tubular body 56 has two windows 57 (FIG. 8 shows one of these windows) in the form of cutouts extending downwardly from the top side or face of the flow divider 54 and serving to admit steam from the chamber 29 into the path which is defined by the flow divider for admission of steam into the aperture 53. The two windows 57 are preferably mirror images of each other with reference to a line which connects the foci of the oval or nearly oval outline of the flow divider 54.

The number of windows 57 can be reduced to one or increased to three or more.

The top face 64 of the flow divider 54 abuts or can abut the cover 15 (not shown in FIGS. 6 to 8) when the cover is properly positioned on top of the container 18 to close the open top of the container and to overlie the open upper side of the receptacle 19. Thus, the underside of the cover can abut the top face of the receptacle 18, the top face of the peripheral wall 43 of the receptacle 19 and the top face 64 of the flow divider 54. This reduces the likelihood of inward bending or buckling of the cover 15 even if the latter is made of a relatively thin and readily deformable material.

The guide members 60 on the bottom wall 30 of the receptacle 19 which is shown in FIGS. 6 to 8 have vane-like end portions 61 with convergent inner sides which direct the flow of heated liquid toward the liquid discharging opening 37 in the bottom wall 30. The guide members 60 flank the inlet 32 and are integral with or are connected to or merely abut the sidewall 31 at the liquid receiving end of the path 62.

The outer sides of the guide members 60 and the adjacent portions of the sidewall 31 define two relatively large compartments 65 which form part of the chamber 29 and communicate with the liquid discharging opening 37 in the bottom wall 30. The flat or inwardly bulging portion 36 of the sidewall 31 cooperates with the downwardly sloping bottom wall 30 to ensure that heated liquid which has entered the compartments 65 flows toward and into the opening 37 with a minimum of turbulence.

The flow divider 54 of the modified machine which is shown in FIGS. 6 to 8 performs a number of functions. Thus, this flow divider establishes a laminar flow of heated liquid from the inlet 32, along the path 62 and toward the vane-like end portions 61 of the guide members 60. In addition, the top face 64 of the flow divider 54 can support the adjacent portion of the cover. Still further, the tubular body 56 of the flow divider 54 defines a channel for the flow of steam from the chamber 29, through the window or windows 57 and toward and into the aperture 53. The window or windows 57 can be omitted if the tubular body 56 is shorter than shown in FIG. 8, i.e., so that the top of the tubular body 56 is not sealed by a properly applied cover 15. If the tubular body 56 is formed with a plurality of windows, such windows are preferably of identical size and shape and are uniformly distributed in the tubular body. This reduces the manufacturing cost.

The improved machine is susceptible of many additional modifications without departing from the spirit of the invention. For example, the number of steam evacuating apertures can be increased to three or more and the configuration of surfaces bounding such aperture or apertures can be changed depending on the dimensions and shape of the filter holder 20 or an analogous vessel which is used as a means for receiving a flavoring agent. Furthermore, the sidewall 31 around the chamber 29 of the collecting receptacle 19 need not have a substantially cylindrical cross-sectional outline. All that counts is to properly select the position or positions of the liquid discharging opening or openings and the position and inclination of the steam evacuating aperture or apertures in order to ensure that the brewing of coffee, tea or another beverage in the filter holder 20 can proceed in an optimum manner. It has been found that the brewing of coffee or another beverage in the filter holder 20 is much more satisfactory if the jet or jets of steam issuing from the aperture or apertures in the bottom wall 30 of the receptacle 19 are not directed vertically downwardly as in heretofore known machines.

Certain additional modifications which are within the purview of the invention include the utilization of a differently configured flow divider, of differently dimensioned and/or configured guide means including the guide members 33 or 60, and of differently dimensioned and/or configured compartments (such as 35 and 65).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A beverage brewing machine comprising a housing having a container for a supply of liquid, said container having outlet means; electric liquid heating means including a conduit with a first inlet connected to said outlet means and an outlet for heated liquid and steam; a collecting receptacle having a second inlet communicating with said outlet and comprising a bottom wall, said receptacle further having at least one liquid discharging opening and at least one steam evacuating aperture which is inclined with reference to said bottom wall; and means for receiving liquid from said receptacle by way of said at least one opening.

2. The machine of claim 1, wherein said conduit includes a riser, said at least one opening being provided in said bottom wall and said receiving means being disposed beneath said bottom wall.

3. The machine of claim 1, wherein said receptacle further comprises a sidewall defining with said bottom wall a chamber which receives liquid and steam from said conduit, said at least one aperture being disposed outside of said chamber.

4. The machine of claim 3, wherein said receptacle further comprises channel means receiving steam from said chamber and communicating with said at least one aperture.

5. The machine of claim 4, wherein said channel means includes an upper portion adjacent said sidewall, said receptacle further comprising at least one substantially upright guide member adjacent said upper portion of said channel means, said sidewall extending to a level above said guide member.

6. The machine of claim 5, wherein said receptacle further comprises wall portions which are inclined to the horizontal and flank said at least one aperture.

7. The machine of claim 1, wherein said housing has a front side adjacent said at least one aperture and further comprising an electric on-off switch provided at said front side and connected in circuit with said electric heating means.

8. The machine of claim 1, wherein said receptacle has a plurality of apertures.

9. The machine of claim 8, wherein said apertures include two substantially mirror symmetrical apertures.

10. The machine of claim 1, wherein said receptacle further comprises two guide members defining a path for the flow of liquid from said second inlet toward said at least one opening, said guide members having liquid diverting portions remote from said second inlet.

11. The machine of claim 10, wherein said receptacle further comprises a sidewall defining with said bottom wall a chamber for said guide members, said at least one opening communicating with said chamber and said guide members having second portions adjacent said liquid diverting portions, said chamber including two compartments each bounded by the fluid diverting portion and the second portion of one of said guide members and by a portion of said sidewall.

12. The machine of claim 11, wherein said liquid diverting portions are adjacent said at least one opening and are inclined with reference to the respective second portions.

13. The machine of claim 1, wherein said receptacle further comprises a sidewall provided with said second inlet and defining with said bottom wall a chamber which communicates with said second inlet and with said at least one opening, said sidewall including a portion closely adjacent said at least one opening.

14. The machine of claim 13, wherein said sidewall is an upright cylinder and said portion thereof has a flat or convex side confronting said at least one opening.

15. The machine of claim 1, wherein said receptacle further comprises a sidewall defining with said bottom wall a chamber which communicates with said second inlet and with said at least one opening, guide means disposed in said chamber and defining a path for the flow of liquid from said second inlet toward said at least one opening, and a flow divider in said path.

16. The machine of claim 15, wherein said guide means includes two substantially upright guide members flanking said path, said flow divider being disposed substantially midway between said guide members and having a substantially elliptical cross-sectional outline.

17. The machine of claim 16, wherein said flow divider includes a first rounded end portion confronting said second inlet and a second rounded end portion confronting said at least one opening.

18. The machine of claim 15, wherein said flow divider is hollow and said bottom wall includes a portion which is inclined to the horizontal and is located beneath said flow divider, said portion of said bottom wall having at least one passage for evacuation of liquid, if any, from said hollow flow divider.

19. The machine of claim 1, wherein said housing has an open top and further comprising a cover for said open top and means for separably coupling said cover to said housing.

20. The machine of claim 19, wherein said housing comprises a lateral extension including said receptacle, said coupling means including substantially hook-shaped coupling elements in said extension.

21. The machine of claim 20, wherein said extension includes a peripheral wall and a second wall spaced apart from and surrounded by said peripheral wall, said coupling elements being disposed between said walls.

22. The machine of claim 1, wherein said housing has a central vertical symmetry plane and said at least one aperture is located in or close to said symmetry plane.

23. The machine of claim 22, wherein said housing comprises a lateral extension including said receptacle and a peripheral wall having a portion remote from said second inlet, said at least one aperture extending in a direction from said second inlet toward said portion of said peripheral wall.

24. The machine of claim 22, wherein said receptacle further comprises a sidewall defining with said bottom wall a chamber which communicates with said second inlet and with said at least one opening, guide means provided in said chamber and defining a path for the flow of liquid from said second inlet toward said at least one opening, and a hollow flow divider in said path, said at least one aperture being provided in said bottom wall beneath said flow divider.

25. The machine of claim 24, wherein said bottom wall includes a portion which is inclined to the horizontal and said at least one aperture having a first portion provided in said inclined portion of said bottom wall, said bottom wall further including a second portion and said at least one aperture having a second portion provided in the second portion of said bottom wall and communicating with said first portion.

26. The machine of claim 24, wherein said housing has an open top and further comprising a cover for said open top, said flow divider including a tubular body extending from said bottom wall toward said cover and said tubular body having at least one window for admission of steam into said tubular body.

27. The machine of claim 26, wherein said tubular body has a substantially elliptical cross-sectional outline and has two windows, said windows being substantially mirror symmetrical to each other with reference to a line connecting the foci of said outline.

28. The machine of claim 26, wherein said tubular body has a top face abutting said cover.

29. The machine of claim 1, wherein said receptacle further comprises a sidewall defining with said bottom wall a chamber which communicates with said second inlet and with said at least one opening, and two substantially parallel guide members provided in said chamber and defining a path for the flow of liquid from said second inlet, said guide members having end portions adjacent to and positioned to direct liquid from said path toward said at least one opening.

30. The machine of claim 29, wherein said chamber includes two compartments which communicate with said at least one opening, each of said compartments being bounded by one of said guide members and by a portion of said sidewall.

* * * * *